(12) United States Patent
Thubert et al.

(10) Patent No.: US 7,539,202 B2
(45) Date of Patent: May 26, 2009

(54) MAINTAINING SECRECY OF ASSIGNED UNIQUE LOCAL ADDRESSES FOR IPV6 NODES WITHIN A PRESCRIBED SITE DURING ACCESS OF A WIDE AREA NETWORK

(75) Inventors: Pascal Thubert, La Colle sur Loup (FR); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 770 days.

(21) Appl. No.: 10/978,384

(22) Filed: Nov. 2, 2004

(65) Prior Publication Data
US 2006/0092949 A1    May 4, 2006

(51) Int. Cl.
    *H04L 12/28*       (2006.01)
(52) U.S. Cl. ....................... 370/401; 370/466
(58) Field of Classification Search ........................ None
See application file for complete search history.

(56) References Cited

U.S. PATENT DOCUMENTS

| | | | |
|---|---|---|---|
| 6,119,171 A | 9/2000 | Alkhatib | |
| 7,321,598 B2 * | 1/2008 | Blanchet et al. | 370/466 |
| 2002/0159465 A1 * | 10/2002 | Watanuki et al. | 370/401 |
| 2004/0032852 A1 | 2/2004 | Thubert et al. | |
| 2004/0057440 A1 | 3/2004 | Thubert et al. | |
| 2004/0081152 A1 | 4/2004 | Thubert et al. | |
| 2004/0117339 A1 | 6/2004 | Thubert et al. | |
| 2004/0179508 A1 | 9/2004 | Thubert et al. | |
| 2004/0179532 A1 | 9/2004 | Thubert et al. | |
| 2004/0179536 A1 | 9/2004 | Thubert et al. | |
| 2004/0196854 A1 | 10/2004 | Thubert et al. | |
| 2004/0202183 A1 | 10/2004 | Thubert et al. | |
| 2004/0223491 A1 | 11/2004 | Levy-Abegnoli et al. | |
| 2004/0228343 A1 | 11/2004 | Molteni et al. | |
| 2004/0246931 A1 | 12/2004 | Thubert et al. | |

(Continued)

OTHER PUBLICATIONS

Hanane Fathi, Leakage-Resilient Security Architecture for Mobile IPv6 in Wireless Overlay Networks, Nov. 2005, IEEE Journal on Selected Areas in Communications, vol. 23, No. 11, 2182-2193.*

(Continued)

*Primary Examiner*—Hassan Kizou
*Assistant Examiner*—Hooman Houshmand
(74) *Attorney, Agent, or Firm*—Leon R. Turkevich (57) ABSTRACT

A network includes network nodes and a gateway. Each network node has a corresponding unique in-site IPv6 address for communication within a prescribed site, each in-site IPv6 address having a first IPv6 address prefix that is not advertised outside of the prescribed site. Network nodes can obtain from within the prescribed site a unique extra-site IPv6 address for mobile or extra-site communications. The extra-site IPv6 address has a second IPv6 address prefix, distinct from the first IPv6 address prefix, advertised by the gateway to the prescribed site and the wide area network. The gateway establishes a secure connection (e.g., tunnel) with each corresponding IPv6 node using its corresponding extra-site IPv6 address, and creates a corresponding binding cache entry specifying the corresponding extra-site IPv6 address and in-site IPv6 address. Hence, the gateway provides wide area network access while maintaining secrecy of the in-site IPv6 addresses.

48 Claims, 8 Drawing Sheets

U.S. PATENT DOCUMENTS

2005/0083969 A1* 4/2005 Lee et al. .................. 370/466
2005/0099971 A1 5/2005 Droms et al.

OTHER PUBLICATIONS

Byung-Jin Han, Group Key Locking Scheme in Mobile IPv6 Networks, Feb. 2007, IEEE, The 9th International Conference on Advanced Communication Technology, ISBN 978-89-5519-131-8 93560, 1021-1026.*

Win Aye, A Key Distribution Scheme for Secure Multicast Over IPv6 Wireless Networks, Nov. 2005, IEEE, Information and Telecommunication Technologies, 2005. APSITT 2005 Proceedings, 322-327.*

Van de Velde et al., "IPv6 Network Architecture Protection", Network Working Group, Internet Draft, <draft-vandevelde-v6ops-nap-00.txt>, Oct. 12, 2004.

Hinden et al., "Unique Local IPv6 Unicast Addresses", IETF Internet Draft, <draft-ietf-ipv6-unique-local-addr-04.txt>, May 14, 2004.

Hinden et al., "Unique Local IPv6 Unicast Addresses", IETF Internet Draft, <draft-ietf-ipv6-unique-local-addr-05.txt>, Jun. 23, 2004.

Hinden et al., "Unique Local IPv6 Unicast Addresses", Network Working Group, Internet Draft, <draft-ietf-ipv6-unique-local-addr-06.txt>, Sep. 24, 2004.

Rosen et al., "BGP/MPLS IP VPNs", IEFT Internet Draft, <draft-ietf-ppvpn-rfc2547bis-04.txt>, May 2003.

Draves et al., "Default Router Preferences and More-Specific Routes", IPng Working Group, Internet Draft, <draft-ietf-ipv6-router-selection-06.txt, Oct. 11, 2004.

Hain et al, "Goals for Organizational-Scope Communications", IPv6 Working Group, Internet Draft, <draft-hain-templin-ipv6-localcomm-04.txt>, Dec. 8, 2003.

Johnson et al, "Mobility Support in IPv6", IETF Mobile IP Working Group, Internet Draft, <draft-ietf-mobileip-ipv6-24.txt>, Jun. 30, 2003.

Rekhter et al, "Address Allocation for Private Internets", Network Working Group, Request for Comments: 1918, Feb. 1996.

Montenegro et al., "Sun's SKIP Firewall Traversal for Mobile IP", Network Working Group, Request for Comments: 2356, Jun. 1998.

Kent et al., IP Encapsulating Security Payload (ESP), Network Working Group, Request for Comments: 2406, Nov. 1998.

Deering et al., "Internet Protocol, Version 6 (IPv6) Specification", Network Working Group, Request for Comments: 2460, Dec. 1998.

Hain, "Architectural Implications of NAT", Network Working Group, Request for Comments: 2993, Nov. 2000.

Hinden et al., "Internet Protocol Verion 6 (IPv6) Addressing Architecture", Network Working Group, Request for Comments: 3513, Apr. 2003.

Abley et al., "Goals for IPv6 Site-Multihoming Architectures", Network Working Group, Request for Comments: 3582, Aug. 2003.

Johnson et al., "Mobility Support in IPv6", Network Working Group, Request for Comments: 3775, Jun. 2004.

Arkko et al., Using IPsec to Protect Mobile IPv6 Signaling Between Mobile Nodes and Home Agents:, Network Working Group, Request for Comments: 3776, Jun. 2004.

* cited by examiner

MAINTAINING SECRECY OF ASSIGNED UNIQUE LOCAL ADDRESSES FOR IPV6 NODES WITHIN A PRESCRIBED SITE DURING ACCESS OF A WIDE AREA NETWORK

BACKGROUND OF THE INVENTION

1. Field of the Invention

The present invention relates to maintaining secrecy of unique local IPv6 addresses (i.e., in-site addresses), used by in-site IPv6 nodes for communication within a prescribed site (e.g., a Virtual Private Network Enterprise), during communications by the in-site IPv6 nodes with nodes that are external to the prescribed site, for example via a wide area network such as the Internet.

2. Description of the Related Art

Several attempts are made to safeguard computers having access to a wide area network (such as the Internet) while preserving network-based services for those computers. Of particular interest is the effort to maintaining the secrecy of an IP address used by a network node.

In particular, efforts are underway to expand the realm of private networks for enterprise applications, where a large private site can formed based on private (e.g., secure) connections and routes are established between remote nodes. An example of a larger private site is a Virtual Private Network as described in the Internet Draft by Rosen et al., "BGP/MPLS IP VPNs", published May 2003. Rosen et al. describes a method by which an IPv4 Service Provider may use an IP backbone to provide IPv4 VPNs (Virtual Private Networks) for its customers. However, Rosen et al. also suggests in Section 11 ("Accessing Internet from a VPN") that private routes would need to be leaked to the global Internet. Consequently, discovery of a private route would enable an untrusted source to analyze an IP address to discover an internal topology of a VPN.

Unfortunately, all nodes within a private network would need to use global source addresses in order to perform any communications with a remote node via a wide area packet switched network such as the Internet. Hence, VPNs cannot be used to hide global source addresses of VPN users.

One approach for hiding global IPv4 source addresses for VPN users has been to deploy Network Address Translators. Network Address Translators (NATs) were originally developed to delay address depletion by resuse of private IPv4 addresses by network nodes in IPv4-based private networks. The NATs, serving as an interface between a private network and the wide area network such as the Internet, would translate between the prescribed IPv4 addresses and a public IPv4 address used by the NAT as a point of attachment to the Internet. In particular, NATs perform a Layer-3 translation of IP addresses, so that public Internet addresses map to private IP addresses, as described in detail by the Request for Comments 1918 (RFC 1918), published by the Internet Engineering Task Force (IETF), available on the World Wide Web at the IETF website. This mapping has allowed enterprises to map a large number of private addresses to a limited number of public addresses, thus limiting the number of public addresses required by Internet users.

In addition, the use of NATs in a private IPv4 network enables the private IPv4 address used by a network node to be "hidden" from the Internet, especially since the private IPv4 addresses are reserved by the Internet Assigned Numbers Authority (IANA) exclusively for private networks. Exemplary IPv4 network prefixes reserved by the IANA for private networks include the 10/8 prefix (a single Class A network number), 172.16/12 prefixes (a set of 1 contiguous Class B network numbers), and 192.168/16 prefix addresses (a set of 256 contiguous Class C network numbers).

Hence, NATs enable VPN users to hide their IPv4 source addresses, and therefore the VPN topology from external entities.

Unfortunately, NATs suffer from numerous problems, as described in details in numerous publications by the IETF, including RFC 2993. Consequently, there is doubt that NATs will be developed for Internet Protocol Version 6 (IPv6) as defined in RFC 2460.

Consequently, concerns arise for the need for security in deployment of IPv6 networks, and preventing IPv6 addresses from being distributed beyond a prescribed site. For example, the Internet Draft by Hinden et al., entitled "Unique Local IPv6 Unicast Addresses", published Sep. 24, 2004, describes an IPv6 unicast address format that is globally unique and intended for local IPv6 communications within-site boundaries, while allowing sites to be combined or privately interconnected.

Although Hinden et al. recognizes that unique local IPv6 unicast addresses could be "leaked" outside the site boundaries onto the Internet, Hinden et al. recommends that border router policies and firewall filtering policies be implemented to prevent the local IPv6 unicast addresses from being sent onto the Internet. Hence, a disadvantage recognized by Hinden et al. is that it is not possible to route local IPv6 prefixes on the global Internet with current routing technology.

SUMMARY OF THE INVENTION

There is a need for an arrangement that enables IPv6 nodes to communicate securely within a prescribed site such as a Virtual Private Network (VPN) Enterprise, while maintaining secrecy if an IPv6 node needs to access a wide area network, without the necessity of a NAT.

There also is a need for an arrangement that enables IPv6 VPN clients to gain access to a wide area network, without the necessity of a NAT, while avoiding disclosure of addressing or topology information related to the VPN.

These and other needs are attained by the present invention, where a network includes network nodes and a gateway. Each network node has a corresponding unique in-site IPv6 address for communication within a prescribed site, each in-site IPv6 address having a first IPv6 address prefix that is not advertised outside of the prescribed site. Network nodes can obtain from within the prescribed site a unique extra-site IPv6 address for mobile or extra-site communications. The extra-site IPv6 address has a second IPv6 address prefix, distinct from the first IPv6 address prefix, advertised by the gateway to the prescribed site and the wide area network. The gateway establishes a secure connection (e.g., tunnel) with each corresponding IPv6 node using its corresponding extra-site IPv6 address, and creates a corresponding binding cache entry specifying the corresponding extra-site IPv6 address and in-site IPv6 address. Hence, the gateway provides wide area network access while maintaining secrecy of the in-site IPv6 addresses.

One aspect of the present invention provides a method in an IPv6 node. The method includes acquiring a unique in-site IPv6 address for communication with at least an IPv6 gateway node within a prescribed site, the unique in-site IPv6 address being reachable only by nodes within the prescribed site, the unique in-site IPv6 address having a first address prefix that is not advertised outside of the prescribed site. The method also includes obtaining from within the prescribed site a unique extra-site IPv6 address having a second address prefix that is distinct from the first address prefix, wherein the second address prefix is advertised inside and outside the prescribed site. The method also includes sending a first packet to a correspondent node outside of the prescribed site. In particular, the first packet is generated, having a first header with a destination address field specifying an IPv6 address of the correspondent node and a source address field specifying the extra-site IPv6 address. A second packet is generated including the first packet and a second header for reception and removal by the IPv6 gateway node, the second header having a destination address field specifying an IPv6 address of the second IPv6 gateway node and a source address field specifying the in-site IPv6 address. The second packet is output, having the first and second headers, to the IPv6 gateway node via a secure connection established between the IPv6 node and the IPv6 gateway node, for transfer of the first packet by the IPv6 gateway node outside of the prescribed site for delivery to the correspondent node.

Another aspect of the present invention provides method in a gateway configured for providing connectivity between a prescribed site and a wide area network. The method includes advertising only within the prescribed site that a first IPv6 address prefix is reachable via the IPv6 gateway, the first IPv6 address prefix not advertised outside of the prescribed site, and advertising to the prescribed site and the wide area network that a second IPv6 address prefix is reachable via the IPv6 gateway. The method also includes establishing a secure connection with a first IPv6 node within the prescribed site, based on the first IPv6 node having a unique in-site IPv6 address that includes the first IPv6 address prefix. A first packet is received from the first IPv6 node, via the secure connection, having a source address field specifying the in-site IPv6 address, a destination address field specifying an IPv6 address of the IPv6 gateway, and a second packet. The second packet is forwarded to a destination node in response to the destination address field of the first packet specifying the IPv6 address of the IPv6 gateway. In particular, the gateway performs the forwarding based on: (1) recovering the second packet from the first packet, the second packet having a source address field specifying a unique extra-site IPv6 address having the second IPv6 address prefix and a destination address field specifying an IPv6 address of the destination node, and (2) outputting the second packet, without the in-site IPv6 address of the first IPv6 node. A binding cache entry is created specifying that the extra-site IPv6 address of the first IPv6 node is reachable via the in-site IPv6 address of the first IPv6 node.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
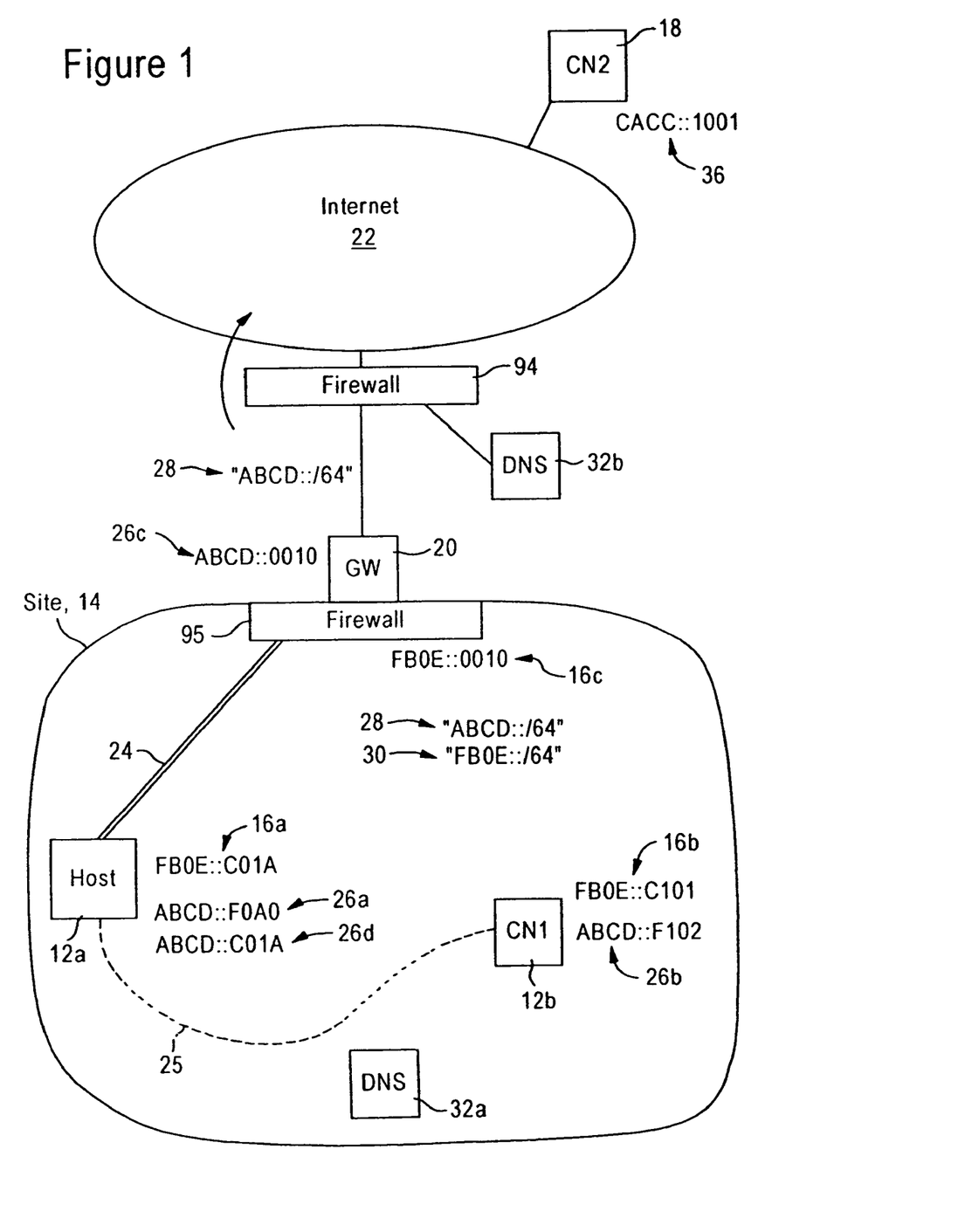
FIG. 1 is a diagram illustrating an internetworking system including a site including IPv6 nodes and a gateway configured for providing connectivity between the site and a wide area network, according to an embodiment of the present invention.

FIG. 1 is a diagram illustrating an internetworking system 10 configured for sending packets between a host network node ("Host") 12a within a prescribed site 14, and correspondent nodes ("CN1" and "CN2") 12b and 18, according to an embodiment of the present invention. The host network node ("Host") 12a and the in-site correspondent node ("CN1") 12b are part of the same site 14, in that they share a trusted relationship (e.g., corporate security agreement, vendor agreement, etc.). The in-site network nodes 12a and 12b have respective assigned in-site IPv6 addresses "FB0E::C01A" 16a and "FB0E::C101" 16b for communication within the prescribed site 14.

The term "site" as used herein follows the definition specified in RFC 3582: an entity autonomously operating a network according to Internet Protocol and, in particular, determining the addressing plan and routing policy for that network. This definition of "site" as used herein is equivalent to the term "enterprise" as defined in RFC 1918.

The term "in-site IPv6 address" is defined herein as an IPv6 address that is visible and reachable only within the site. Hence, the "in-site IPv6 address" is essentially the same as (and hence also is referred to herein as) a "unique local IPv6 address", as defined in the above-identified Internet Draft by Hinden et al., entitled "Unique Local IPv6 Unicast Addresses".

Hence, the nodes 12a and 12b can communicate using their respective unique local IPv6 addresses (i.e., in-site IPv6 addresses) 16a and 16b based on the mutual trusted relationship. The site addresses could be obtained from a global range, as described in RFC 3513; alternately, the site addresses could be obtained from an organizational scope as described in the Internet Draft by Hain et al., entitled "Goals for Organizational-Scope Communications", Dec. 8, 2003.

The external correspondent node 18, however, has no such trusted relationship with any node 12 in the site 14. Hence, there is a need for the network nodes 12 to be able to hide their unique local IPv6 addresses 16 from the external correspondent node 18. In particular, hiding the unique local IPv6 address (e.g., 16a) not only protects the identity of the corresponding host (e.g., 12a), but also hides the topology of the site 14.

According to the disclosed embodiment, the prescribed site 14 includes a gateway 20 configured for transferring data between the host network node (e.g., 12a) and the external correspondent node 18 via an external network 22 such as the Internet. In particular, the gateway 20 and the host network node 12a use a secure connection (e.g., a secure tunnel) 24 based on the unique local address 16a of the network node.

According to the disclosed embodiment, the gateway 20 assigns to the network node 12*a* a corresponding extra-site IPv6 address 26*a*. The term "extra-site IPv6 address" is defined herein as an IPv6 address that is globally visible and reachable inside a site 14, but is not used to physically point to a host (e.g., 12*a*). Rather, the extra-site IPv6 address 26*a* is a logical redirection (like a pointer) that is dynamically mapped, by the means of the disclosed embodiment, to a second address providing connectivity. The second address is an in-site address (e.g., 16*a*) when the host node 12 is located within the site, or a care-of address (e.g., 26*d*) when the host node is located outside of the site 14 (i.e., in the wide area network 22). The extra-site address space 28 is virtually located at a site gateway.

Hence, the gateway 20 assigns to the network node 12*a* corresponding extra-site address as a public IPv6 address "ABCD::F0A0" 26*a* having an IPv6 address prefix "ABCD::/64" 28 advertised as reachable via the gateway 20. The gateway 20 advertises the address prefix "ABCD::/64" 28 to both the prescribed site 14 and the wide area network 22. However, the gateway 20 advertises the IPv6 address prefix "FB0E::/64" 30 of the in-site IPv6 addresses 16*a*, 16*b* only within the prescribed site 14, and not outside of the prescribed site 14; hence, the wide area network 22 is unable to route any packet having the in-site address prefix "FB0E::/64" 30 due to the absence of any routing information. Hence, the secrecy of the unique local addresses 16*a*, 16*b* within the prescribed site 14 is maintained.

The disclosed embodiment provides reachability for the node 12*a* that needs to access extra-site correspondent node "CN2" 18 based on deploying within the site 14 an extended version of "Mobile IPv6" protocol, described for example in RFC 3775 by Johnson et al., entitled "Mobility Support in IPv6", published June 2004. According to RFC 3775, the Mobile IPv6 protocol enables a mobile node to move from one link to another without changing the mobile node's IP address. In particular, the mobile node is assigned a "home address". The "home address" is an IP address assigned to the mobile node within its home subnet prefix on its home link. While a mobile node is attached to its home link, packets addressed to its home address are routed to the mobile node's home link, using conventional Internet routing mechanisms.

The mobile node of RFC 3775 also is assigned a home agent for registering any care-of address used by the mobile node at its point of attachment to the Internet while the mobile node is away from its home link. A care-of address is an IP address associated with a mobile node that has the subnet prefix of a particular link away from its home link (i.e., a foreign link). A home agent is a router on a mobile node's home link with which the mobile node has registered its current care-of address. While the mobile node is away from its home link, the home agent intercepts packets on the home link destined to the mobile node's home address; the home agent encapsulates the packets, and tunnels the packets to the mobile node's registered care-of address.

Hence, a mobile node of RFC 3775 is always addressable by its "home address": packets may be routed to the mobile node using this address regardless of the mobile node's current point of attachment to the Internet. The mobile node also may continue to communicate with other nodes (stationary or mobile) after moving to a new link. The movement of a mobile node away from its home link is thus transparent to transport and higher-layer protocols and applications.

According to the disclosed embodiment, the "Mobile IPv6" protocol is extended by enabling the in-site network nodes 12*a* and 12*b* to utilize their in-site addresses 16*a* and 16*b* in place of the care-of address described in RFC 3775.

The in-site addresses 16*a* and 16*b* also can be provided to an internal Domain Name Service (DNS) 32*a*, enabling the DNS 32*a* to resolve host names "Host" and "CN1" to respective in-site addresses "FB0E::C01A" 16*a* and "FB0E::C101" 14*b*.

In addition, the gateway 20, acting as the home agent as described in RFC 3775, is configured for assigning an extra-site address as the "home address" described in RFC 3775, for example "ABCD::F0A0" 26*a* to node 12*a* and "ABCD::F102" 26*b* to node 12*b*, based on the public IPv6 address prefix "ABCD::/64" 28 advertised publicly on the wide area network 22. Assignment of extra-site addresses may be based on static or dynamic assignment, based on requirements. For example, if a node (e.g., 12*a*) inside the site 14 is a mobile IPv6 node, the extra-site address (e.g., 12*a*) can be provisioned and advertised by an external DNS 32*b* (i.e., a DNS that is separate from the site 14 to ensure security of the site 14); if the node (e.g., 12*b*) needs to reach the Internet 22, the node 12*b* may obtain the extra-site address (e.g., 26*b*) dynamically, for example by DHCPv6 per RFC 3315.

Hence, the disclosed embodiment enables the in-site nodes 12*a*, 12*b* to hide their in-site IPv6 addresses 16*a*, 16*b* to a node 18 outside of the site 14 by using extra-site addresses 26*a*, 26*b*.

In addition, the disclosed embodiment is compatible with the existing Mobile IPv6 protocol, enabling the host node 12*a*, when implemented as a mobile node, to continue communication with any node while the mobile node 12*a* is in the wide area network 22; as described below, the mobile node 12*a* sends a binding update message to an external address "ABCD::0010" 26*c* used by the gateway 20. The binding update message to the gateway 20 specifies that the mobile node 12*a* using the extra-site address "ABCD::F0A0" 26*a* address is reachable via the external care-of address "ABCD::C01A" 26*d* within the public address prefix "ABCD::/64" 28 owned by the gateway 20. Hence, the gateway 20 is able to establish a secure tunnel with the mobile node 12*a* while the mobile node 12*a* is in the wide area network 22, encapsulating any packets destined for the extra-site address "ABCD::F0A0" 26*a* to the care-of address "ABCD::C01A" 26*d*.

Figure 2:
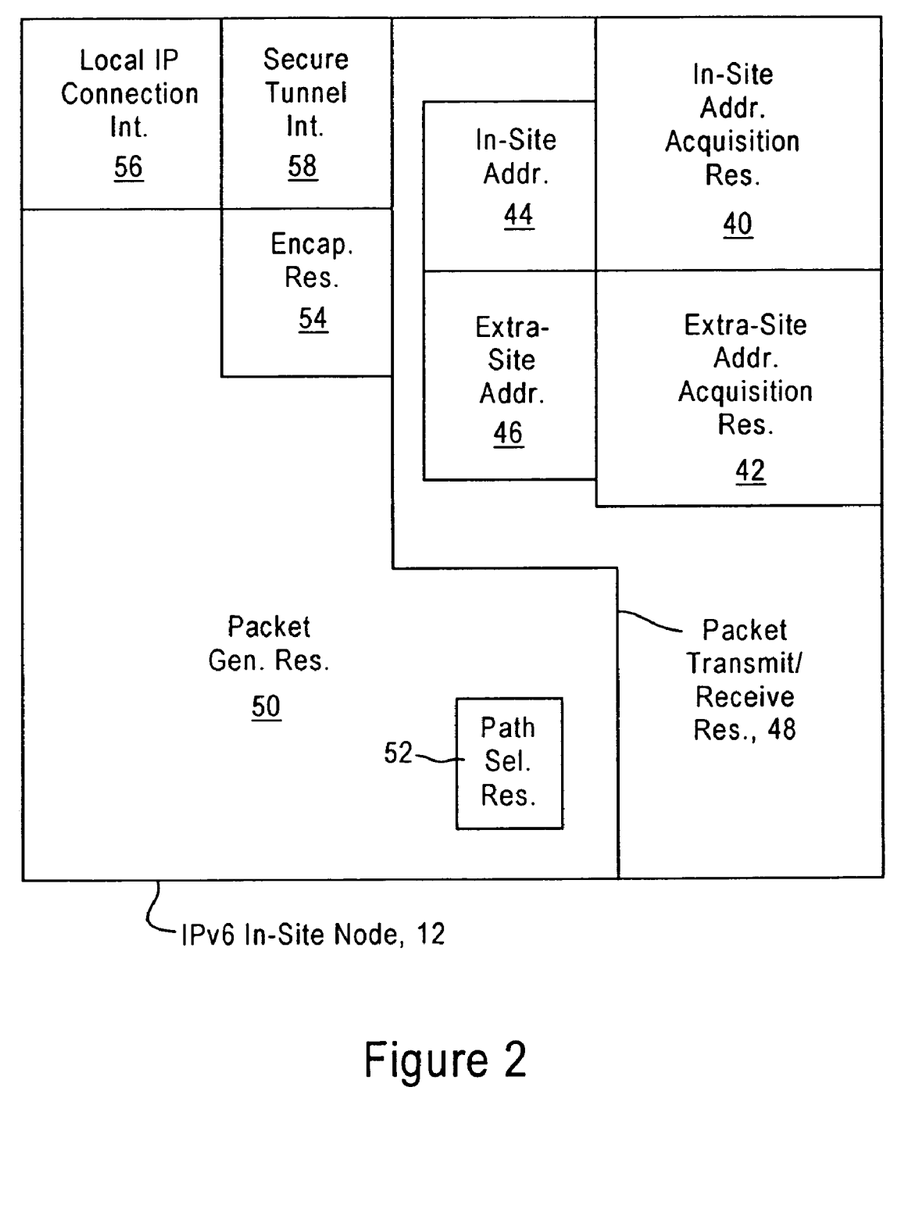
FIG. 2 is a diagram illustrating in detail the IPv6 host node of FIG. 1, according to an embodiment of the present invention.

FIG. 2 is a diagram illustrating the host network node 12 (e.g., 12*a*), according to an embodiment of the present invention. The IPv6 node 12 includes address acquisition resources, including an in-site address acquisition resource 40, and an extra-site address acquisition resource 42. The in-site address acquisition resource 40 is configured for acquiring the unique in-site IPv6 address "FB0E::C01A" 16*a* that enables communication with other nodes within the site 14, for example the correspondent node (CN1) 12*b* or the gateway 20. The acquisition resource 40 can be configured for obtaining the in-site address 16*a* using, for example, stateless autoconfiguration according to RFC 2462, or alternately according to DHCPv6, according to RFC 3315.

The extra-site address acquisition resource 42 is configured for obtaining from the prescribed site 14 the unique extra-site IPv6 address "ABCD::F0A0" 26*a* that has the address prefix "ABCD::/64" 28 distinct from the in-site address prefix "FB0E::/64" 30. The resource 42 may acquire the extra-site address 26A using different techniques, depending on application. For example a permanent extra-site address 26*a* may be assigned according to RFC 2462; alternately, a dynamic extra-site address 26*a* may be dynamically built by the resource 42 based on the prefix "ABCD::/64" 28 advertised by the gateway 20. Alternately, the resource 42 may acquire an extra-site IPv6 address 26*a* according to DHCPv6 protocol as specified in RFC 3315.

The acquired in-site address 16a and the extra-site address 26a are stored in respective registers 44 and 46 for use by a packet transmit and receive resource 48.

The packet transmit and receive resource 48 is configured for generating a packet for transfer to a correspondent node (CN2) 18 outside of the prescribed site 14, using the secure tunnel 24 between the network node 12a and the gateway 20. In particular, the packet transmit and receive resource 48 includes a packet generation resource 50 having a path selection resource 52. The packet transmit and receive resource 48 also includes an encapsulation resource 54, a local IP connection interface 56, and a secure tunnel interface 58.

The selection resource 52 is configured for selecting a path for a packet, namely using the secure tunnel 24 established by the secure tunnel interface 58, or a local connection 25 (illustrated in FIG. 1) via the IP interface 56. According to the disclosed embodiment, the path selection resource 52 selects the secure tunnel 24 if the IPv6 node 12 is a mobile node, or if in the case of a fixed node the destination of the packet is outside the prescribed site 14, as indicated by the destination address.

Figure 4A:
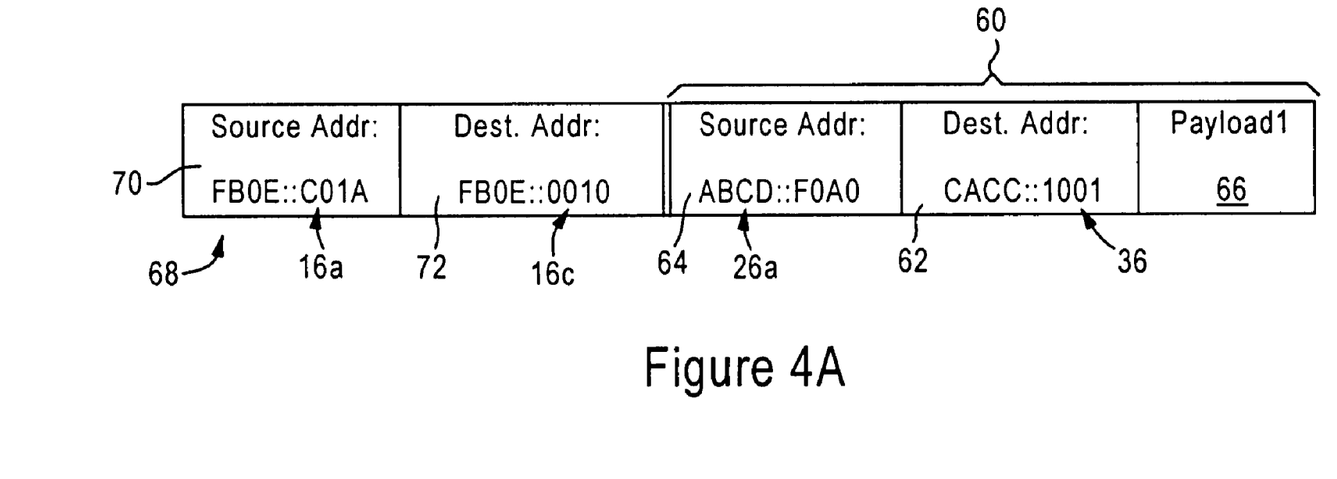
FIGS. 4A, 4B, 4C and 4D are diagrams illustrating examples of encapsulated IPv6 packets sent and received between the IPv6 host node and the gateway of FIG. 1, according to an embodiment of the present invention.

FIG. 4A is a diagram illustrating a packet 68 output by the host node 12a from within the site 14, where the packet 68 encapsulates a first packet 60 destined for the correspondent node "CN2" 18. In particular, the packet generation resource 50 generates a first packet 60 having a destination address field 62 specifying the IPv6 address "CACC::1001" 36 of the correspondent node (CN2) 18, and a payload 66. Assuming in this example that the host node 12a is a fixed node, the path selection resource 52 selects the extra-site address 26a based on the destination address field 36 specifying an address 36 outside the prescribed site 14, based on the destination address 36 not matching the advertised address prefixes 28 or 30; hence, the source address field 64 specifies the extra-site IPv6 address 26a of the host network node 12a. The encapsulation resource 54 is configured for encapsulating the packet 60 into a second packet 68 having a source address field 70 specifying the in-site IPv6 address "FB0E::C01A" 16a, and a destination address field 72 specifying the in-site address "FB0E::0010" 16c of the gateway 20.

The secure tunnel interface 58 outputs the packet 68 via the tunnel 24 to the gateway 20, enabling the gateway to decapsulate the packet 68 and output the packet 60 to the correspondent node 18 via the wide area network 22, without the in-site address 16a of the IPv6 node 12a. As described below, the packet transmit and receive resource 48 also is configured for receiving, via the tunnel 24, encapsulated packets 74 and 76 as illustrated in FIGS. 4B and 4C, respectively.

Figure 4B:
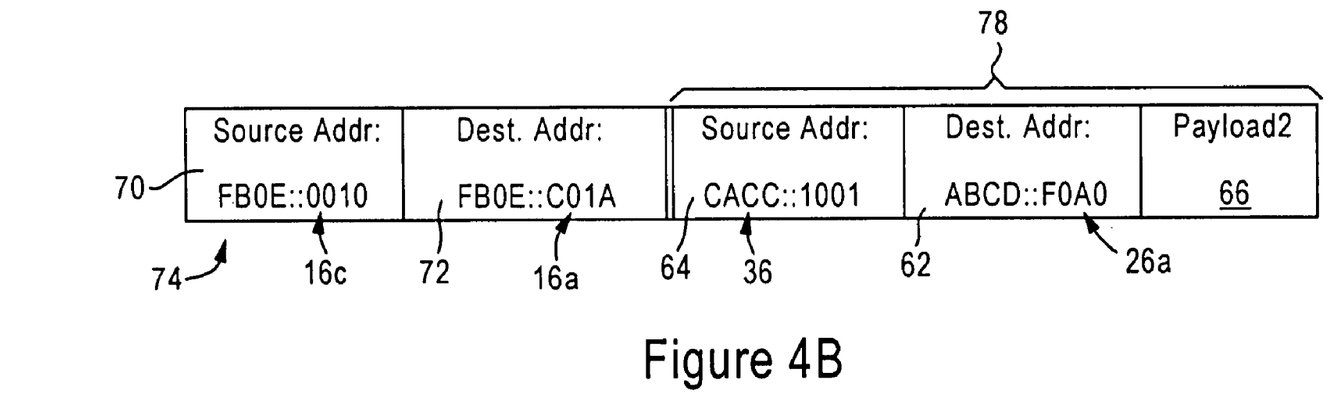

FIG. 4B is a diagram illustrating the packet 74 output by the gateway 20 of a packet 78 originated from the correspondent node (CN2) 18, for transfer via the tunnel 24 to the host network node 12a inside the site 14. The gateway 20 is configured for encapsulating the packet 78 with a header having a source address field 70 specifying the IPv6 in-site address "FB0E::0010" 16c of the gateway 20, and a destination address field 72 specifying the in-site IPv6 address "FB0E::C01A" 16a of the destination host node 12a.

Figure 4C:
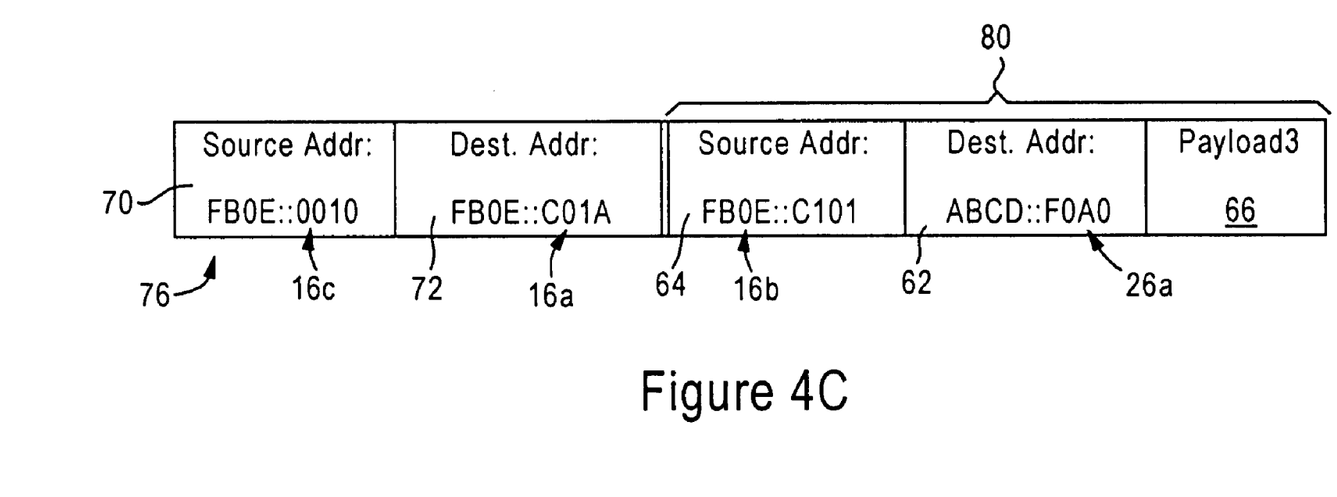

FIG. 4C is a diagram illustrating the packet 76 output by the gateway 20, wherein the packet 76 encapsulates a packet 80 having been sent by the in-site correspondent node (CN1) 12b for delivery to the host node 12a within the site 14. As described above, the gateway 20 is configured for encapsulating the in-site packet 80 into an encapsulated packet 76 based on the destination address field 62 specifying the extra-site address "ABCD::F0A0" 26a, where the gateway 20 identifies the destination via the corresponding binding cache entry stored within the gateway. In this case, the in-site tunnel 24 between the host mobile node 12a and the gateway 20 is effective in maintaining connectivity as the host node 12a moves throughout the prescribed site 14.

Figure 4D:
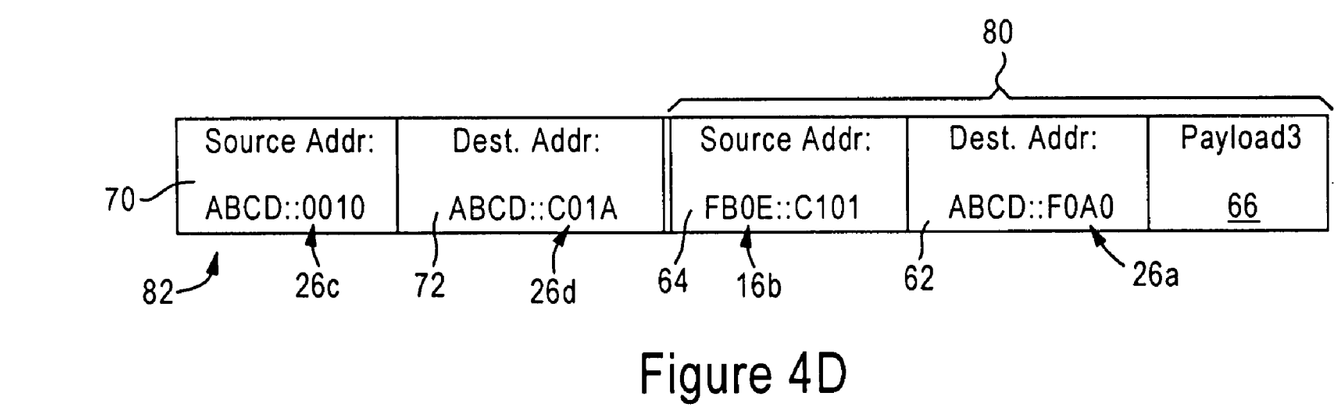

FIG. 4D is a diagram illustrating a packet 82 output by the gateway 20, where the packet 82 encapsulates the packet 80 having been sent by the in-site correspondent node (CN1) 12b, where the mobile node 12a is no longer within the site 14, but rather is within the wide area network 22. In this case, the packet transmit and receive resource 48 of the mobile node 12a is configured for using an extra-site address 26d as an external care-of address according to Mobile IPv6 protocol. As recognized in the art, the packet transmit and receive resource 48 may select its external care-of address within the address prefix "ABCD::/64" 28 of the gateway 20 using different means. The packet transmit and receive resource 48 sends a binding update message to the gateway 20 indicating that the mobile node 12a is reachable via the external (i.e., extra-site) care-of address "ABCD::C01A" 26d, and creates a secure tunnel with the gateway 20 using the external care-of address "ABCD::C01A" 26d. Hence, the packet transmit and receive resource 48 may receive the packet 80 from the correspondent node 12b, illustrated in FIG. 4D, via a secure tunnel with the gateway 20 while the mobile node 12 is moving within the wide area network 22.

Figure 3:
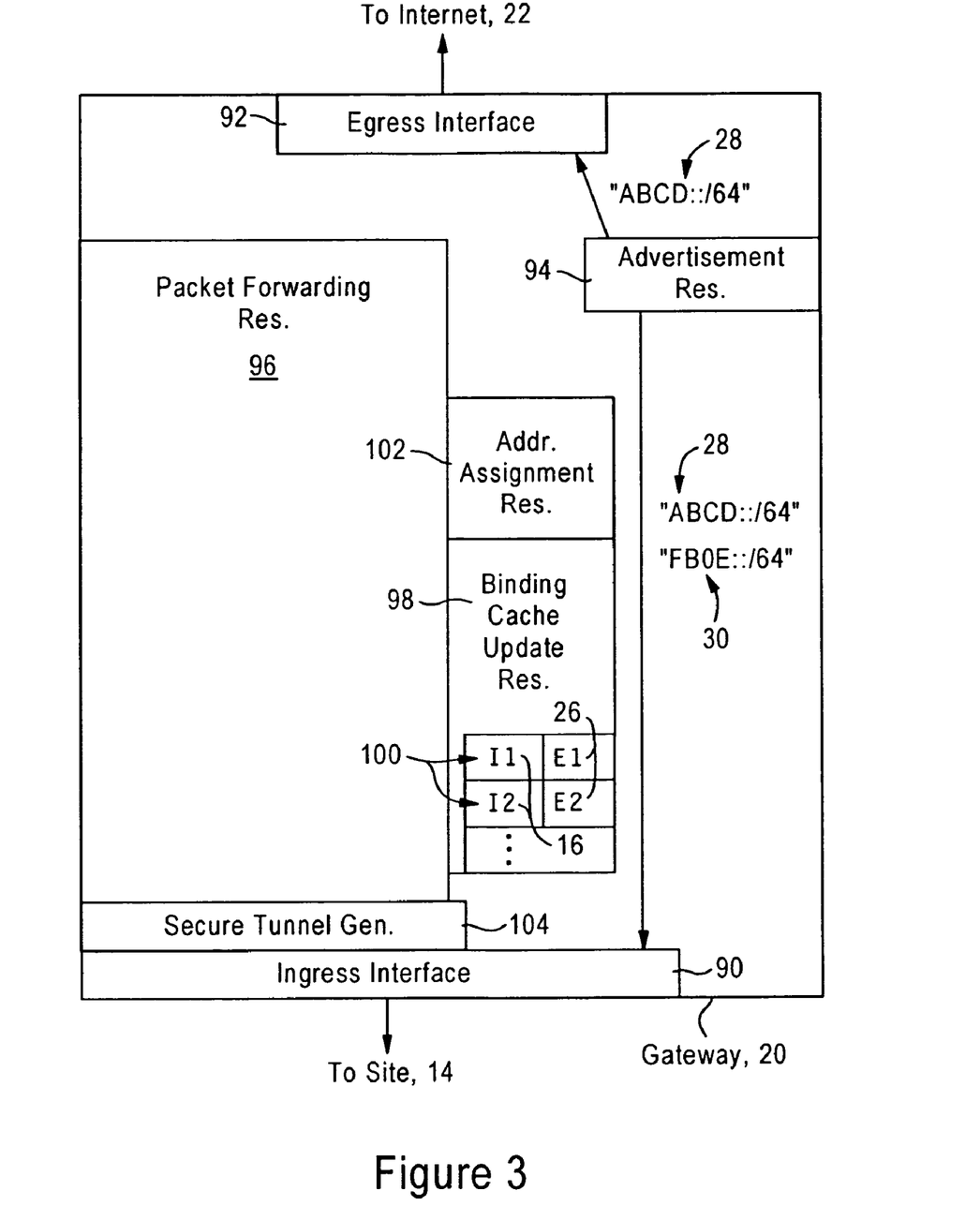
FIG. 3 is a diagram illustrating in detail the gateway of FIG. 1, according to an embodiment of the present invention.

FIG. 3 is a diagram illustrating the gateway 20, according to an embodiment of the present invention. The gateway 20 includes an ingress interface 90 configured for sending and receiving packets onto the site 14, and an egress interface 92 configured for sending and receiving packets onto the wide area network 22. As illustrated in FIG. 1, each of the interfaces 90 and 92 may be connected to a corresponding firewall 95 to provide additional security for the prescribed site 14.

The gateway 20 includes an advertisement resource 94, a packet forwarding resource 96, a binding cache resource 98 configured for managing binding cache entries 100, an address assignment resource 102, and a secure tunnel generation resource 104. The advertisement resource 94 is configured for advertising the in-site IPv6 address prefix "FB0E::/64" 30 only within the prescribed site 14. As described above, the in-site address prefix "FB0E::/64" 30 is not advertised outside of the prescribed site 14 to ensure that any IPv6 address specifying the in-site address prefix "FB0E::/64" 30 is not routable within the wide area network 22.

The advertisement resource 94 also advertises the extra-site address prefix "ABCD::/64" 28 in both the wide area network 22 and the prescribed site 14.

The secure tunnel generation resource 104 is configured for creating the secure tunnel 24 with the corresponding host network node (e.g., 12a) within the prescribed site 14. As apparent from the foregoing, the gateway 20 is configured for generating multiple secure tunnels 24 with respective host network nodes 12. The secure tunnel generation resource 104 also is configured for creating secure tunnels with mobile nodes in the wide area network 22 according to Mobile IP protocol, for example in the case where the host node 12a is within the wide area network 22 and uses its external care-of address "ABCD::C01A" 26d for secure tunneling of packets 68, 74.

The binding cache resource 98 is configured for creating and maintaining binding cache entries 100 that specify, for each assigned extra-site address 26, the corresponding care-of address, enabling the packet forwarding resource 96 to perform encapsulation and decapsulation of packets for the respective tunnels (e.g., in-site tunnels 24 and extra-site tunnels). For example, if the host node 12a is within the site 14, the binding cache resource 98 would update the corresponding entry 100 to specify that the address "ABCD::F0A0" is reachable via the in-site address "FB0E::C01A" 16a; in contrast, if the host node 12a is within the wide area network 22, the binding cache resource 98 would update the corresponding entry 100 to specify that the address "ABCD::F0A0" is reachable via the extra-site address ABCD::C01A" 26d.

The packet forwarding resource 96 is configured for forwarding the packet received from a host 12 by a corresponding tunnel 24 to the appropriate destination. For example, the packet forwarding resource 96 is configured for receiving the packet 68 of FIG. 4A from the secure tunnel 24 of host network node 12a, removing the header portion 70 and 72, and forwarding the recovered packet 60 to the wide area network 22 for delivery to the correspondent node 18 based on the corresponding destination address 36.

The packet forwarding resource 96 also is configured for encapsulating received packets, for example packets 78 and 80 from the correspondent nodes 18 and 12b, respectively, and outputting the respective encapsulated packets 74 and 76 onto the secure tunnel 24 for delivery to the host network node 12a. As described above, the packet 78 is encapsulated by the packet forwarding resource 96 based on the packet 78 having been originated by a network node having an address "CACC::1001" 36 outside the in-site address prefix "FB0E::/64" 30 or the extra-site address prefix "ABCD::/64" 28. In contrast, the packet 80 would be encapsulated by the packet forwarding resource 96 based on the host network node 12a being a mobile network node.

Note, however, that in the case of the host node 12a being a mobile network node, intra-site communications may be optimized by route optimization. An example of route optimization is provided in RFC 3775. Hence, the packet forwarding resource 96 is configured for enabling route optimization between the nodes 12a and 12b, however the packet forwarding resource 96 will prevent any route optimization from occurring between the in-site IPv6 nodes 12 and any extra-site nodes such as the correspondent note (CN) 18.

Figure 5A:
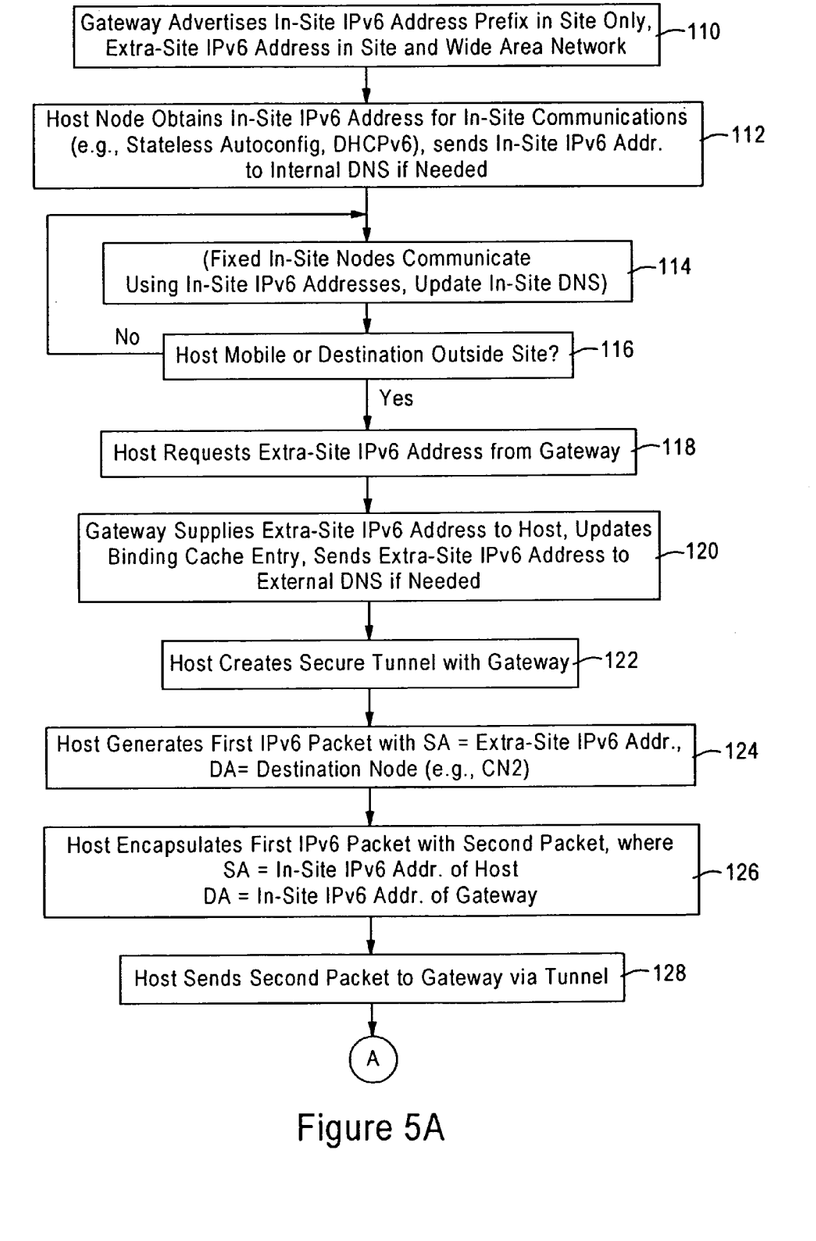
FIGS. 5A, 5B and 5C are flow diagrams summarizing the method of sending IPv6 packets by the IPv6 host node and the gateway of FIG. 1, while maintaining secrecy of in-site IPv6 addresses, according to an embodiment of the present invention.
Figure 5B:
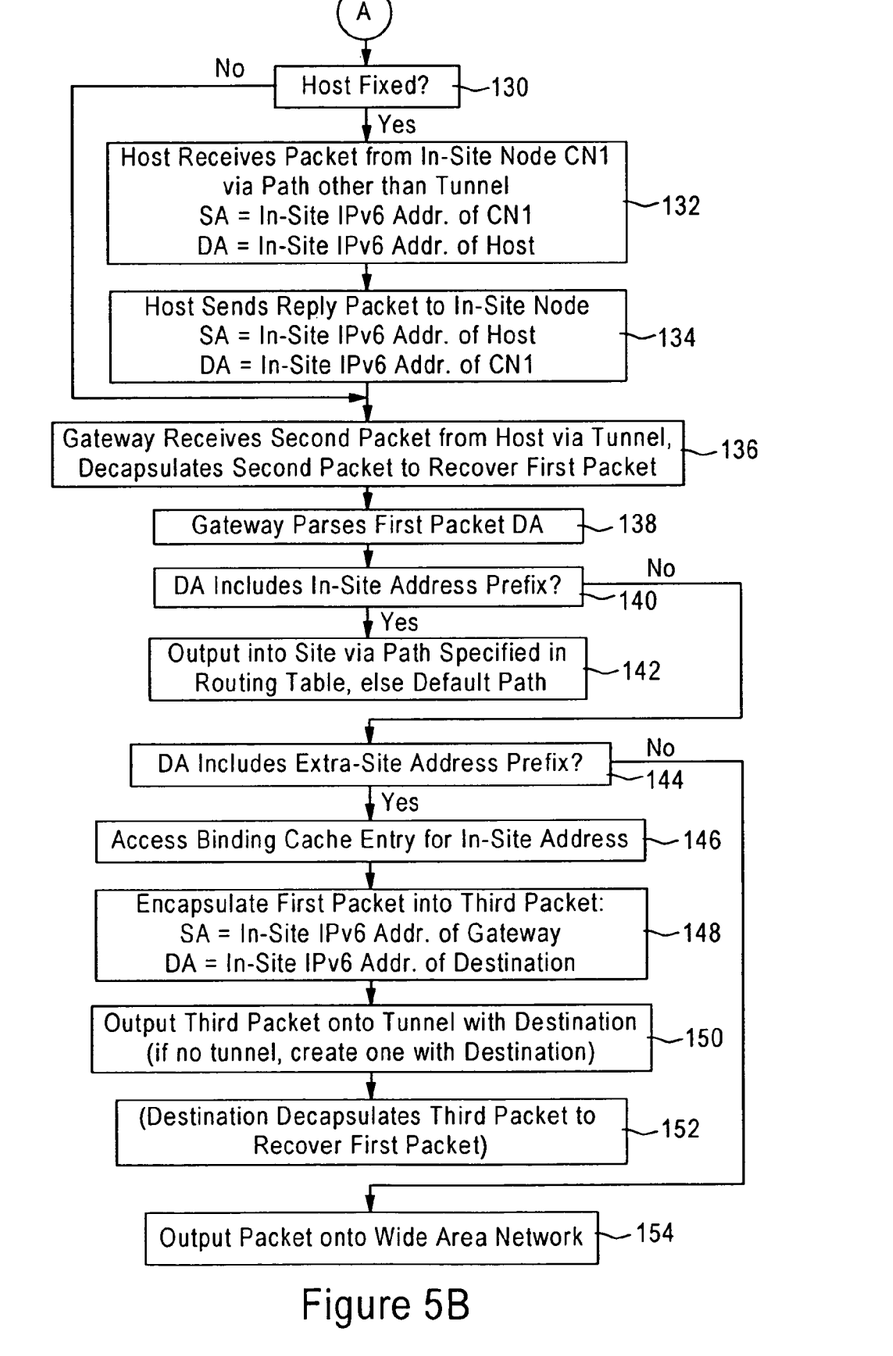
Figure 5C:
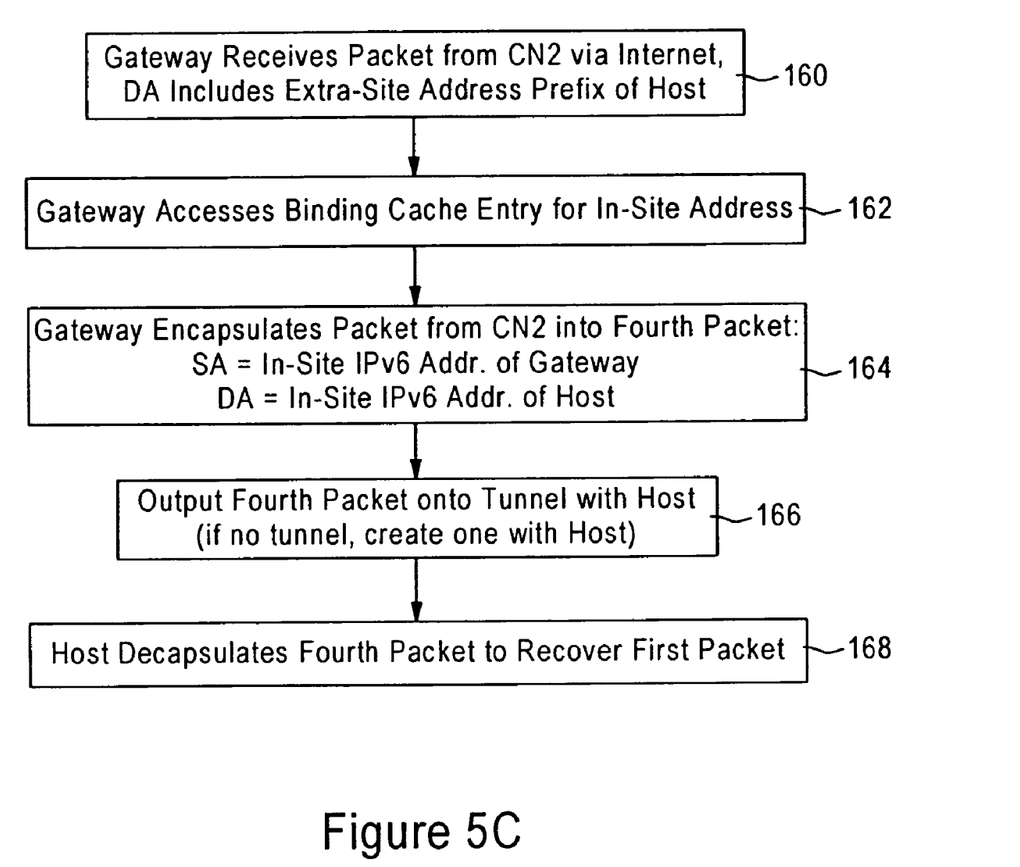

FIGS. 5A, 5B and 5C are flow diagrams summarizing the method of sending IPv6 packets by the IPv6 host node and the gateway of FIG. 1, while maintaining secrecy of in-site IPv6 addresses, according to an embodiment of the present invention. The steps described herein with respect to FIGS. 5A, 5B and 5C can be implemented in the respective mobile routers as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 110, where the advertisement resource 94 advertises the in-site address prefix "FB0E::/64" 30 only within the site 14, and advertises the extra-site address prefix "ABCD::/64" 28 within both the prescribed site 14 and the wide area network 22.

The acquisition resource 40 of the host node 12 (e.g., 12a) obtains in step 112 an in-site IPv6 address 16 (e.g., "FB0E::C01A" 16a) for in-site communications using, for example, stateless autoconfiguration according to RFC 2462, or DHCPv6 according to RFC 3315. If needed, the in-site IPv6 resource 40 is configured for sending in step 112 its in-site IPv6 address 16 and host name to an internal domain name service (DNS) 32a. Assuming the host 12a is a fixed node, the fixed node can begin communicating with other in-site IP addresses and update the in-site DNS 32a as needed in step 114. At this stage, use of an extra-site IPv6 address 26 is not needed unless in step 116 the host network node 12 is a mobile node, or if the host network node 12 is a fixed node that needs to communicate with a destination node 18 outside of the prescribed site 14.

Assuming in step 116 that the host node 12a requires an extra-site IPv6 address 26 due to mobility or communication with an external node 18, the extra-site address acquisition resource 42 requests in step 118 an extra-site IPv6 address from the gateway 20. Alternatively, the resource 42 may generate its own extra-site address "ABCD::F0A0" 26a in response to detecting a router advertisement message from the gateway 20 advertising the extra-site address prefix "ABCD::/64" 28.

Assuming the host 12a sends the request to the gateway 20, the address assignment resource 102 of the gateway 20 supplies in step 120 an extra-site IPv6 address "ABCD::F0A0" 26a to the host 12a, and the binding update resource 98 updates in step 120 its binding cache entries 100 to indicate that the extra-site IPv6 address "ABCD::F0A0" 26a is reachable via the in-site address "FB0E::C01A" 16a. A Dynamic Name Server can be updated with the extra-site IPv6 address and a corresponding host name assigned to the IPv6 node, the Dynamic Name Server configured for providing the extra-site IPv6 address, outside of the prescribed site, in response to a query from outside of the prescribed site and that requests a reachable address for the host name assigned to the IPv6 node.

The secure tunnel interface 58 of the IPv6 node 12a creates in step 122 a secure tunnel 24 with the secure tunnel generation resource 104 of the gateway 20 in step 122.

Upon establishment of the secure tunnel 24, the host network node 12a is able to begin transmitting packets to the correspondent node 18. The packet generation resource 50 generates in step 124 the first IPv6 packet 60 with the source address field 64 specifying the extra-site IPv6 address 26a, and the destination address field 62 specifying the IPv6 address 36 of the correspondent node 18. The encapsulation resource 54 of the IPv6 node 12a encapsulates in step 126 the packet 60 within the second packet 68, where the destination address field 72 specifies the IPv6 in-site IPv6 address 16c of the gateway 20. The secure tunnel interface 58 outputs in step 128 the packet 68 to the gateway 20 via the secure tunnel 24.

Referring to FIG. 5B, if in step 130 the host network node 12a is fixed, the host network node 12a can receive in step 132 additional packets from an in-site node 12b via a path 25 other than the secure tunnel 24; in this case, the host network node 12a would receive the packet 80, illustrated in FIG. 4C, without the need for any encapsulation (i.e., without the header containing fields 70 and 72). The host network node 12a could then send in step 134 a reply packet to the in-site corresponding node 12b using its in-site address 16a as the source address, and the in-site address 16b as the destination address.

Referring to step 136, assume that the gateway 20 receives the packet 68 having been sent by the host network node 12a in step 128 via the tunnel 24. The packet forwarding resource 96 parses in step 138 the destination address field 62 of the first packet 60, and determines in step 140 whether the destination address includes an in-site address prefix "FB0E::/64" 30. As described above, the host network node 12a will send a packet via the tunnel 24 if it is a mobile node, regardless of whether the destination is located within the prescribed site 14 or outside the site 14, for example via the wide area network 22. If the packet forwarding resource 96 determines the destination address field 62 specifies the in-site address prefix "FB0E::/64" 30 (and assuming the destination is a fixed node), the packet forwarding resource 96 outputs in step 142 the decapsulated packet into the site 14 by a path specified in its internal routing table, else using a default path.

In addition, the packet forwarding resource 96 may initiate route optimization between the two in-site nodes, as necessary.

If in step 140 the destination address field 62 does not specify an in-site address prefix "FB0E::/64" 30, the packet forwarding resource 96 determines in step 144 whether the destination address field 62 specifies the extra-site address prefix "ABCD::/64" 28, for example for a destination mobile node. If the destination address field 62 does not specify either the in-site address prefix "FB0E::/64" 30 or the extra-site address prefix "ABCD::/64" 28, the packet forwarding resource 96 outputs in step 154 the decapsulated packet 60 onto the wide area network 22 via the egress interface 92.

However, if the destination address field 62 specifies an extra-site address prefix "ABCD::/64" 28, the packet forwarding resource 96 accesses in step 146 the binding cache entry 100 for the address (e.g., in-site address for in-site node or extra-site care-of address for node outside of site) corresponding to the extra-site address 26 specified in the destination address field. Assuming that the destination node is in the site 14, the packet forwarding resource 96 encapsulates in step 148 the first packet into a third packet, where the source address field 70 specifies the in-site IPv6 address 16c of the gateway 20, and the destination address field 72 specifies the in-site IPv6 address 16 of the destination network node 12. The secure tunnel generation resource 14 outputs in step 150 the encapsulated packet onto the corresponding tunnel 24 for delivery to the corresponding destination; note that if no tunnel is available, for example due to an incoming Voice over IP telephone call, then the secure tunnel generation resource 14 creates a new tunnel 24 with the corresponding destination node 12. The destination node 12 decapsulates the received packet in step 152 in order to recover the original packet.

FIG. 5C illustrates encapsulation of the packet 78, output from the correspondent node 18, for delivery to the host network node 12a. The egress interface 92 receives in step 160 the packet 78 from the correspondent node 18 via the wide area network 22, where the destination address field 62 specifies the extra-site address 26a having the extra-site address prefix "ABCD::/64" 28. In response to detecting the extra-site address prefix "ABCD::/64" 28, the forwarding resource 96 accesses in step 162 the binding cache entry 100 for the corresponding in-site address 16a. The packet forwarding resource 96 encapsulates in step 164 the packet 78 into a fourth packet 74 having a source address field 70 specifying the in-site IPv6 address 16c of the gateway 20, and a destination address field 72 specifying the in-site IPv6 address 16a of the host network node 12a.

The secure tunnel generation resource 104 of the gateway 20 outputs in step 166 the fourth packet 74 onto the tunnel 24 for delivery to the destination host network node 12a. As described above, if no tunnel 24 is present, for example due to an incoming Voice over IP call from the correspondent node 18, the secure tunnel generation resource 104 creates a new tunnel with the host 12a. The host network node 12a decapsulates in step 168 the received packet 74 in order to recover the packet 78.

According to the disclosed embodiment, global reachability can be provided for IPv6 network nodes within a prescribed site, while maintaining secrecy of the in-site IPv6 address space, without the necessity of a NAT. Hence, security can be maintained without the disadvantages typically encountered by NATs.

Note that the disclosed embodiment also could be implemented without the use of IPv6 protocol. For example, a mobile router according to NEMO technology, as opposed to IPv6 technology. In other words, a mobile router can be deployed that performs the mobility operations on behalf of the in-site nodes: the mobile router need not be necessarily "mobile", but can be fixed while performing mobility operations as described herein. In particular, the mobile router may employ the techniques described in the Internet Draft by Draves et al., "Default Router Preferences and More-Specific Routes" Oct. 11, 2004, available on the IETF website.

In particular, Draves et al. describes how router advertisements can be extended to provide reachability information. Hence, the mobile router would advertise itself inside the site as two different routers available via respective distinct links, one link advertised as reachable using the in-site prefix, the other link advertised as reachable using the extra-site prefix; hence, the fixed node can obtain an address based on the in-site prefix. The mobile router would advertise outside the site only the extra-site prefix: the mobile router would identify itself as a default route to the prefix.

Hence, an in-site node can be a fixed node having two addresses (an in-site address and an extra-site address), and a mobile router performs tunneling for the fixed node, where routing is set up such that the fixed node uses the appropriate address for accessing the Internet via a tunnel between the fixed node and the mobile router. Hence, the implementation of the Internet Draft by Draves et al. enables a mobile router to select the appropriate prefix.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an IPv6 node, the method including:
   acquiring a unique in-site IPv6 address for communication with at least an IPv6 gateway node within a prescribed site, the unique in-site IPv6 address being reachable only by nodes within the prescribed site, the unique in-site IPv6 address having a first address prefix that is not advertised outside of the prescribed site;
   obtaining from within the prescribed site a unique extra-site IPv6 address having a second address prefix that is distinct from the first address prefix, wherein the second address prefix is advertised inside and outside the prescribed site; and
   sending a first packet to a correspondent node outside of the prescribed site based on:
   (1) first generating the first packet, the first packet having a first header with a destination address field specifying an address of the correspondent node and a source address field specifying the extra-site IPv6 address,
   (2) second generating a second packet including the first packet and a second header for reception and removal by the IPv6 gateway node, the second header having a destination address field specifying an IPv6 address of the IPv6 gateway node and a source address field specifying the in-site IPv6 address, and
   (3) outputting the second packet, having the first and second headers, to the IPv6 gateway node via a secure connection established between the IPv6 node and the IPv6 gateway node, for transfer of the first packet by the IPv6 gateway node outside of the prescribed site for delivery to the correspondent node.

2. The method of claim 1, wherein the sending also includes establishing the secure connection as a secure tunnel between the IPv6 node and the IPv6 gateway node.

3. The method of claim 1, the method further comprising receiving a third packet, having been generated by a second correspondent node inside the prescribed site, the third packet including a corresponding source address field specifying a corresponding second in-site IPv6 address of the second correspondent node that includes the first address prefix, the third packet further including a corresponding destination address field specifying the in-site IPv6 address of the IPv6 node.

4. The method of claim 3, wherein the third packet is received via a path independent of the secure connection, the IPv6 node being a fixed node.

5. The method of claim 3, further comprising sending a fourth packet to the second correspondent node via a path independent of the secure connection based on the second correspondent node using the second in-site IPv6 address, the fourth packet having a corresponding source address field specifying the in-site IPv6 address of the IPv6 node and a corresponding destination address field specifying the second in-site IPv6 address.

6. The method of claim 1, further comprising:
receiving a third packet via the secure connection, the third packet including a third header including a corresponding source address field specifying the IPv6 address of the IPv6 gateway node, the third header further including a corresponding destination address field specifying the in-site IPv6 address of the IPv6 node;
recovering from within the third packet a fourth packet having a fourth header including a corresponding destination address field specifying the extra-site IPv6 address of the IPv6 node.

7. The method of claim 6, wherein the fourth header includes a corresponding source address field specifying the IPv6 address of the correspondent node outside of the prescribed site.

8. The method of claim 6, wherein the fourth header includes a corresponding source address field specifying a second in-site IPv6 address of a second correspondent node inside the prescribed site.

9. The method of claim 8, further including selecting the extra-site IPv6 address as a source address for a fourth packet to be sent to the second in-site IPv6 address via the secure connection, following encapsulating in a fifth packet specifying the in-site IPv6 address of the IPv6 node as the corresponding source address, based on the IPv6 node being a mobile node.

10. The method of claim 1, the obtaining including updating a first Dynamic Name Server with the extra-site IPv6 address and a corresponding host name assigned to the IPv6 node, the Dynamic Name Server configured for providing the extra-site IPv6 address, outside of the prescribed site, in response to a query from outside of the prescribed site and that requests a reachable address for the host name assigned to the IPv6 node.

11. The method of claim 10, wherein the acquiring includes updating a second Dynamic Name Server with the in-site IPv6 address and the corresponding host name, the second Dynamic Name Server configured for providing the in-site IPv6 address, only within the prescribed site, in response to a second query from inside the prescribed site and that requests a reachable address for the host name assigned to the IPv6 node.

12. The method of claim 1, the acquiring including updating a Dynamic Name Server with the in-site IPv6 address and a corresponding host name assigned to the IPv6 node, the Dynamic Name Server configured for providing the in-site IPv6 address, only within the prescribed site, in response to a query from inside the prescribed site and that requests a reachable address for the host name assigned to the IPv6 node.

13. A method in an IPv6 gateway configured for providing connectivity between a prescribed site and a wide area network, the method comprising:
advertising only within the prescribed site that a first IPv6 address prefix is reachable via the IPv6 gateway, the first IPv6 address prefix not advertised outside of the prescribed site;
advertising to the prescribed site and the wide area network that a second IPv6 address prefix is reachable via the IPv6 gateway;
establishing a secure connection with a first IPv6 node within the prescribed site, based on the first IPv6 node having a unique in-site IPv6 address that includes the first IPv6 address prefix;
receiving from the first IPv6 node, via the secure connection, a first packet having a source address field specifying the in-site IPv6 address, a destination address field specifying an IPv6 address of the IPv6 gateway, and a second packet;
forwarding the second packet to a destination node in response to the destination address field of the first packet specifying the IPv6 address of the IPv6 gateway, including:
(1) recovering the second packet from the first packet, the second packet having a source address field specifying a unique extra-site IPv6 address having the second IPv6 address prefix and a destination address field specifying an IPv6 address of the destination node, and
(2) outputting the second packet, without the in-site IPv6 address of the first IPv6 node; and
creating a binding cache entry specifying that the extra-site IPv6 address of the first IPv6 node is reachable via the in-site IPv6 address of the first IPv6 node.

14. The method of claim 13, further comprising:
determining that the IPv6 address of the destination node includes one of the first IPv6 address prefix or the second IPv6 address prefix, and
performing route optimization within the prescribed site between the first IPv6 node and the destination node based on the IPv6 address of the destination node including the one IPv6 address prefix.

15. The method of claim 13, further comprising:
determining that the IPv6 address of the destination node includes a third IPv6 address prefix distinct from any one of the first IPv6 address prefix or the second IPv6 address prefix, and
preventing any route optimization between the first IPv6 node and the destination node based on the third IPv6 address prefix being distinct from the first IPv6 address prefix.

16. The method of claim 13, further comprising assigning the extra-site IPv6 address to the first IPv6 node in response to a request thereof, the binding cache entry created in response to the assigning of the extra-site IPv6 address.

17. The method of claim 16, further comprising updating a Dynamic Name Server with the extra-site IPv6 address and a corresponding host name having been assigned to the first IPv6 node, the Dynamic Name Server configured for providing the extra-site IPv6 address, to a node in the wide area network, in response to a corresponding query that requests a reachable address for the host name assigned to the first IPv6 node.

18. The method of claim 13, wherein the secure connection is established as a secure tunnel between the IPv6 gateway and the first IPv6 node.

19. The method of claim 13, wherein the outputting includes at least one of:
  first outputting the second packet into the prescribed site via a prescribed route based on the IPv6 address of the destination node specifying the first IPv6 address prefix; or
  second outputting the second packet into the prescribed site via a second secure connection, established between the IPv6 gateway and the destination node, based on the IPv6 address of the destination node specifying the second IPv6 address prefix.

20. The method of claim 19, wherein the outputting further includes third outputting the second packet onto the wide area network based on the IPv6 address of the destination node specifying an address prefix distinct from any one of the first IPv6 address prefix or the second IPv6 address prefix.

21. A network configured for communications with a wide area network, the network comprising:
  IPv6 network nodes, each having a corresponding unique in-site IPv6 address for communication within a prescribed site, each of the in-site IPv6 addresses having a first IPv6 address prefix that is not advertised outside of the prescribed site, at least one of the IPv6 network nodes configured for obtaining from within the prescribed site a unique extra-site IPv6 address having a second IPv6 address prefix that is distinct from the first IPv6 address prefix; and
  a gateway configured for:
  (1) advertising to the prescribed site and the wide area network that the second IPv6 address prefix is reachable via the gateway,
  (2) advertising only within the prescribed site that the first IPv6 address prefix is reachable via the gateway, the first IPv6 address prefix not advertised outside of the prescribed site,
  (3) establishing a secure connection with each corresponding IPv6 network node that uses a corresponding extra-site IPv6 address having the second IPv6 address prefix, the gateway configured for creating, for said each IPv6 network node that uses a corresponding extra-site IPv6 address, a corresponding binding cache entry specifying the corresponding extra-site IPv6 address and in-site IPv6 address,
  (4) decapasulating a first packet, received from one of the secure connections, having a source address field specifying the corresponding in-site IPv6 address and a second packet, the second packet having a source address field specifying the corresponding extra-site IPv6 address, and
  (5) outputting the second packet for a specified destination node, without the corresponding in-site IPv6 address specified in the source address field of the first packet.

22. The network of claim 21, wherein each secure connection is a secure tunnel.

23. The network of claim 21, wherein the gateway further is configured for:
  receiving a third packet having a destination address field specifying a destination address having the second IPv6 address prefix;
  encapsulating the third packet into a fourth packet having a destination address field specifying a destination in-site IPv6 address having been identified based on the corresponding binding cache entry specifying the destination address; and
  outputting the fourth packet onto the corresponding secure connection terminated by the IPv6 network node having the destination in-site IPv6 address.

24. The network of claim 21, wherein each IPv6 network node is configured for selecting the corresponding extra-site IPv6 address as a source address for a transmit packet, based on the destination of the transmit packet being reachable outside the prescribed site.

25. The network of claim 24, wherein:
  each IPv6 network node is configured as one of a fixed node or a mobile node,
  each mobile node configured for selecting the corresponding extra-site IPv6 address as the corresponding source address independent of the destination, and
  each fixed node configured for selecting the corresponding extra-site IPv6 address as a source address for a transmit packet based on the destination of the transmit packet being reachable outside the prescribed site, and selecting the corresponding in-site IPv6 address as the source address for the transmit packet based on the destination being reachable inside the prescribed site.

26. The network of claim 24, wherein the gateway is configured for performing route optimization between first and second of the IPv6 network nodes within the prescribed site and utilizing the respective secure connections.

27. The network of claim 21, further comprising a first Dynamic Name Server configured for supplying one of the extra-site IPv6 addresses in response to a query specifying a corresponding host name assigned to corresponding the IPv6 network node, the Dynamic Name Server configured for providing the extra-site IPv6 address, independent of whether the query is received from inside the prescribed site.

28. The network of claim 27, further comprising a second Dynamic Name Server configured for supplying one of the in-site IPv6 addresses in response to a query specifying a corresponding host name assigned to corresponding the IPv6 network node, the Dynamic Name Server configured for providing the in-site IPv6 address only inside the prescribed site and not outside the prescribed site.

29. An IPv6 node comprising:
  means for acquiring a unique in-site IPv6 address for communication with at least an IPv6 gateway node within a prescribed site, the unique in-site IPv6 address being reachable only by nodes within the prescribed site, the unique in-site IPv6 address having a first address prefix that is not advertised outside of the prescribed site;
  means for obtaining from within the prescribed site a unique extra-site IPv6 address having a second address prefix that is distinct from the first address prefix, wherein the second address prefix is advertised inside and outside the prescribed site; and
  means for sending a first packet to a correspondent node outside of the prescribed site based on:
  (1) first generating the first packet, the first packet having a first header with a destination address field specifying an IPv6 address of the correspondent node and a source address field specifying the extra-site IPv6 address,
  (2) second generating a second packet including the first packet and a second header for reception and removal by the IPv6 gateway node, the second header having a destination address field specifying an IPv6 address of the IPv6 gateway node and a source address field specifying the in-site IPv6 address, and
  (3) outputting the second packet, having the first and second headers, to the IPv6 gateway node via a secure connection established between the IPv6 node and the IPv6 gateway node, for transfer of the first packet by the IPv6 gateway node outside of the prescribed site for delivery to the correspondent node.

30. The IPv6 node of claim 29, wherein the means for sending is configured for establishing the secure connection as a secure tunnel between the IPv6 node and the IPv6 gateway node.

31. The IPv6 node of claim 29, wherein the sending means is configured for receiving a third packet, having been generated by a second correspondent node inside the prescribed site, the third packet including a corresponding source address field specifying a corresponding second in-site IPv6 address of the second correspondent node that includes the first address prefix, the third packet further including a corresponding destination address field specifying the in-site IPv6 address of the IPv6 node.

32. The IPv6 node of claim 31, wherein the third packet is received via a path independent of the secure connection, the IPv6 node being a fixed node.

33. The IPv6 node of claim 31, wherein the means for sending is configured for sending a fourth packet to the second correspondent node via a path independent of the secure connection based on the second correspondent node using the second in-site IPv6 address, the fourth packet having a corresponding source address field specifying the in-site IPv6 address of the IPv6 node and a corresponding destination address field specifying the second in-site IPv6 address.

34. The IPv6 node of claim 29, wherein the means for sending is configured for:
   receiving a third packet via the secure connection, the third packet including a third header including a corresponding source address field specifying the IPv6 address of the IPv6 gateway node, the third header further including a corresponding destination address field specifying the in-site IPv6 address of the IPv6 node;
   recovering from within the third packet a fourth packet having a fourth header including a corresponding destination address field specifying the extra-site IPv6 address of the IPv6 node.

35. The IPv6 node of claim 34, wherein the fourth header includes a corresponding source address field specifying the IPv6 address of the correspondent node outside of the prescribed site.

36. The IPv6 node of claim 34, wherein the fourth header includes a corresponding source address field specifying a second in-site IPv6 address of a second correspondent node inside the prescribed site.

37. The IPv6 node of claim 36, wherein the means for sending is configured for selecting the extra-site IPv6 address as a source address for a fourth packet to be sent to the second in-site IPv6 address via the secure connection, following encapsulating in a fifth packet specifying the in-site IPv6 address of the IPv6 node as the corresponding source address, based on the IPv6 node being a mobile node.

38. The IPv6 node of claim 29, wherein the means for obtaining is configured for updating a first Dynamic Name Server with the extra-site IPv6 address and a corresponding host name assigned to the IPv6 node, the Dynamic Name Server configured for providing the extra-site IPv6 address, outside of the prescribed site, in response to a query from outside of the prescribed site and that requests a reachable address for the host name assigned to the IPv6 node.

39. The IPv6 node of claim 38, wherein the means for acquiring is configured for updating a second Dynamic Name Server with the in-site IPv6 address and the corresponding host name, the second Dynamic Name Server configured for providing the in-site IPv6 address, only within the prescribed site, in response to a second query from inside the prescribed site and that requests a reachable address for the host name assigned to the IPv6 node.

40. The IPv6 node of claim 29, wherein the means for acquiring is configured for updating a Dynamic Name Server with the in-site IPv6 address and a corresponding host name assigned to the IPv6 node, the Dynamic Name Server configured for providing the in-site IPv6 address, only within the prescribed site, in response to a query from inside the prescribed site and that requests a reachable address for the host name assigned to the IPv6 node.

41. A gateway configured for providing connectivity between a prescribed site and a wide area network, the gateway comprising:
   means for advertising only within the prescribed site that a first IPv6 address prefix is reachable via the gateway, the first address prefix not advertised outside of the prescribed site, the means for advertising configured for advertising to the prescribed site and the wide area network that a second IPv6 address prefix is reachable via the gateway;
   means for establishing a secure connection with a first IPv6 node within the prescribed site, based on the first IPv6 node having a unique in-site IPv6 address that includes the first IPv6 address prefix, the means for establishing configured for receiving from the first IPv6 node, via the secure connection, a first packet having a source address field specifying the in-site IPv6 address, a destination address field specifying an IPv6 address of the gateway, and a second packet;
   means for forwarding the second packet to a destination node in response to the destination address field of the first packet specifying the IPv6 address of the gateway, based on:
   (1) recovering the second packet from the first packet, the second packet having a source address field specifying a unique extra-site IPv6 address having the second IPv6 address prefix and a destination address field specifying an IPv6 address of the destination node, and
   (2) outputting the second packet, without the in-site IPv6 address of the first IPv6 node; and
   means for creating a binding cache entry specifying that the extra-site IPv6 address of the first IPv6 node is reachable via the in-site IPv6 address of the first IPv6 node.

42. The gateway of claim 41, wherein the means for forwarding is configured for:
   determining that the IPv6 address of the destination node includes one of the first IPv6 address prefix or the second IPv6 address prefix, and
   performing route optimization within the prescribed site between the first IPv6 node and the destination node based on the IPv6 address of the destination node including the one IPv6 address prefix.

43. The gateway of claim 41, wherein the means for forwarding is configured for:
   determining that the IPv6 address of the destination node includes a third IPv6 address prefix distinct from any one of the first IPv6 address prefix or the second IPv6 address prefix, and
   preventing any route optimization between the first IPv6 node and the destination node based on the third IPv6 address prefix being distinct from the first address prefix.

44. The gateway of claim 41, further comprising means for assigning the extra-site IPv6 address to the first IPv6 node in response to a request thereof, the binding cache entry created by the means for creating in response to the assigning of the extra-site IPv6 address.

45. The gateway of claim 44, wherein the means for assigning is configured for updating a Dynamic Name Server with the extra-site IPv6 address and a corresponding host name having been assigned to the first IPv6 node, the Dynamic Name Server configured for providing the extra-site IPv6 address, to a node in the wide area network, in response to a corresponding query that requests a reachable address for the host name assigned to the first IPv6 node.

46. The gateway of claim 41, wherein the secure connection is established as a secure tunnel between the gateway and the first IPv6 node.

47. The gateway of claim 41, wherein the means for forwarding is configured for:
  first outputting the second packet into the prescribed site via a prescribed route based on the IPv6 address of the destination node specifying the first IPv6 address prefix; and
  second outputting the second packet into the prescribed site via a second secure connection, established between the gateway and the destination node, based on the IPv6 address of the destination node specifying the second IPv6 address prefix.

48. The gateway of claim 47, wherein the means for forwarding further is configured for third outputting the second packet onto the wide area network based on the IPv6 address of the destination node specifying an address prefix distinct from any one of the first IPv6 address prefix or the second IPv6 address prefix.

* * * * *